US009434835B2

(12) United States Patent
Ter Woort et al.

(10) Patent No.: US 9,434,835 B2
(45) Date of Patent: Sep. 6, 2016

(54) BLEND FOR USE IN AUTOMOBILE APPLICATION

(75) Inventors: Christian Ter Woort, Overijse (BE); Emmanuelle Koscher, Martigues (FR); Filip Vandoorne, Lochristi (BE)

(73) Assignee: TOTAL PETROCHEMICALS RESEARCH FELUY, Seneffe (BE)

( * ) Notice: Subject to any disclaimer, the term of this patent is extended or adjusted under 35 U.S.C. 154(b) by 993 days.

(21) Appl. No.: 12/598,711

(22) PCT Filed: Apr. 30, 2008

(86) PCT No.: PCT/EP2008/055315
§ 371 (c)(1),
(2), (4) Date: Nov. 18, 2010

(87) PCT Pub. No.: WO2008/135483
PCT Pub. Date: Nov. 13, 2008

(65) Prior Publication Data
US 2011/0054110 A1    Mar. 3, 2011

(30) Foreign Application Priority Data
May 4, 2007    (EP) .................................... 07107551

(51) Int. Cl.
| | |
|---|---|
| *C08F 110/06* | (2006.01) |
| *C08K 5/00* | (2006.01) |
| *C08L 23/00* | (2006.01) |
| *C08L 23/10* | (2006.01) |
| *C08L 23/08* | (2006.01) |
| *C08L 23/12* | (2006.01) |

(52) U.S. Cl.
CPC ............ *C08L 23/10* (2013.01); *C08L 23/0815* (2013.01); *C08L 23/12* (2013.01)

(58) Field of Classification Search
CPC ......... C08F 110/06; C08K 5/00; C08L 23/00
USPC ........................... 526/351; 525/240; 524/515
See application file for complete search history.

(56) References Cited

U.S. PATENT DOCUMENTS

| | | | |
|---|---|---|---|
| 6,797,779 B1 | 9/2004 | Ajbani et al. | |
| 2003/0017325 A1* | 1/2003 | Akimoto et al. | .......... 428/318.4 |
| 2003/0187121 A1* | 10/2003 | Kawai | ..................... C08L 23/12 524/451 |
| 2004/0030050 A1* | 2/2004 | Lin | ....................... C08F 110/06 525/240 |
| 2004/0044107 A1 | 3/2004 | Kikuchi | |
| 2006/0142497 A1 | 6/2006 | Stevens | |
| 2007/0037914 A1 | 2/2007 | Heck | |

FOREIGN PATENT DOCUMENTS

| | | | | |
|---|---|---|---|---|
| EP | 0704463 | | 4/1996 | |
| EP | 1302508 | A1 | 4/2003 | |
| EP | 1741725 | A1 | 1/2007 | |
| EP | 1988122 | A1 | 11/2008 | |
| EP | 2108679 | A1 | 10/2009 | |
| JP | 7504925 | A1 | 6/1995 | |
| JP | 08197609 | A1 | 8/1996 | |
| JP | 20022753428 | A1 | 9/2002 | |
| JP | 2008156408 | A | 7/2008 | |
| JP | 2008156407 | A | 5/2011 | |
| WO | 9312148 | A1 | 6/1993 | |
| WO | WO 9710300 | A1 * | 3/1997 | ............. C08L 23/14 |
| WO | WO 0140358 | A1 * | 6/2001 | |
| WO | 02074855 | A1 | 9/2002 | |
| WO | 03051934 | A2 | 6/2003 | |
| WO | 2006104245 | A1 | 10/2006 | |
| WO | 2008075782 | A1 | 6/2008 | |
| WO | 2008075785 | A1 | 6/2008 | |

OTHER PUBLICATIONS

Office Action issued in Japanese Patent Application No. 2010-503532, dated Mar. 29, 2012 and English translation thereof (6 pages).
G.J. Ray et al., "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, n° 4, Jul.-Aug. 1977, p. 773-778.
Plastics Additives Handbook, ed. H. Zweifel, 5th edition, 2001, Hanser Publishers.
Experimental Report of Dr. Alexander Standler, 3 pages, Feb. 2013.
Borealis presentation of Nov. 2006 (SKZ), 8 pages.
Borealis presentation of Nov. 2011 (APST2), 11 pages.
European Patent Application No. 07 107 551.9.
Communication of a Notice of Opposition issued in European Patent Patent No. 2144962, dated Mar. 12, 2013; (6 pages).
Brief Communication issued in European Patent Patent No. 2144962, dated Aug. 14, 2015, 9 pages.
ISO 3146, 22 pages.
ISO 11357, 46 pages.
Datasheet of VESTAMELT 732 of Evonik, 2 pages.

* cited by examiner

*Primary Examiner* — Alexa Neckel
*Assistant Examiner* — Elizabeth Eng
(74) *Attorney, Agent, or Firm* — Albert Shung

(57) ABSTRACT

The present invention relates to a blend comprising metallocene polypropylene and an elastomer for automobile parts, characterized in that said blend has low volatile organic compounds emissions. The invention also relates to the use of said blend in parts for automobiles.

20 Claims, No Drawings

US 9,434,835 B2

BLEND FOR USE IN AUTOMOBILE APPLICATION

CROSS-REFERENCE TO RELATED APPLICATIONS

This application claims the benefit of PCT/EP2008/055315, filed Apr. 30, 2008, which claims priority from EP 07107551.9, filed May 4, 2007.

FIELD OF THE INVENTION

The present invention relates to a blend comprising polypropylene and an elastomer component for use in automotive applications, especially for use in interior automobile applications.

BACKGROUND OF THE INVENTION

Polypropylene has taken on an important role as base material for the automotive industry. Today, it is widely used for exterior automotive applications, such as bumpers and side sills, as well as interior automotive applications, such as dashboards and interior trim. Polypropylene offers the advantages of having a low density, good mechanical strength, good heat resistance, good chemical resistance etc. as well as that of being a low-cost material in comparison to other suitable materials.

Originally the limited impact strength of polypropylene was a limiting factor in its use for automotive applications. This problem has, however, been overcome by blending polypropylene with elastomers. The elastomer component of the blend results in improved impact strength and an increased brittle temperature. Blends of this type are for example disclosed in document U.S. Pat. No. 6,797,779. Among a large number of possible polypropylenes metallocene-catalyzed polypropylenes are included as well.

Further, US-A-2004/0044107 discloses interior automotive parts comprising
(A) a crystalline homopolypropylene,
(B) a crystalline homopolypropylene and an ethylene-propylene copolymer rubber, said rubber having an intrinsic viscosity on 4.0 to 7.0 dl/g (decalin, 135° C.), ethylene content from 45% to 80% by mass and the rubber being present in at least 10% by mass of the homopolypropylene,
(C) a crystalline homopolypropylene and an ethylene-propylene copolymer rubber, said rubber having an intrinsic viscosity on 5.0 to 10 dl/g (decalin, 135° C.), ethylene content from 45% to 80% by mass and the rubber being present in at least 10% by mass of the homopolypropylene, and
(D) an ethylene/α-olefin rubber.

The resulting interior automotive parts are characterized by good molding properties and a good balance of physical properties, as well as good appearance, lower gloss and scratch resistance. The homopolypropylene (A) has a fraction soluble in boiling p-xylene, which suitably is 6.0% by mass or less, preferably 3.0% by mass or less, more preferably 0.1 to 2.0% by mass.

US-A-2007/0037914 discloses automotive parts formed from filled thermoplastic polyolefin compositions, wherein the filled thermoplastic compositions comprise a highly crystalline isotactic propylene homopolymer, an ethylene/α-olefin elastomeric impact modifier, and a reinforcing grade of a platy filler, for example talc. The invention aims at providing automotive parts that have excellent thermal and mechanical properties. The document makes not mention of emissions originating from such automotive parts.

In light of an overall reduction of emissions from cars the emission of volatile organic compounds (VOC) coming from polypropylene-based automotive parts has recently attracted special attention.

None of the above-cited documents addresses this problem. It is noted in this respect that a low level of solubles e.g. in boiling p-xylene cannot be taken as an indication of low VOC emissions. It has to be kept in mind that the volatile organic compounds (VOC) are removed together with the p-xylene when the p-xylene is removed for the isolation of the solubles.

It is therefore an object of the present invention to provide polypropylene-based blends showing good mechanical properties and in particular good rigidity and impact strength while at the same time having low emissions of volatile organic compounds (VOC).

SUMMARY OF THE INVENTION

Accordingly, the present invention provides an automobile part comprising a blend, said blend comprising
(a) 99.1-20 wt % of a polypropylene produced in the presence of a metallocene-based catalyst, and
(b) 0.1-50 w % of an elastomer,
said blend having less than 45 ppm of volatile organic compounds (determined in accordance with VDA-278).

The invention also relates to the use of a blend comprising
(a) 99.1-20 wt % of a polypropylene produced in the presence of a metallocene-based catalyst, and
(b) 0.1-50 w % of an elastomer,
for producing automobile parts having less than 45 ppm of volatile organic compounds (determined in accordance with VDA-278).

DETAILED DESCRIPTION OF THE INVENTION

The blends used in the present invention comprise
(a) 99.1-20 wt % of a polypropylene produced in the presence of a metallocene-based catalyst, and
(b) 0.1-50 w % of an elastomer.

The metallocene polypropylenes, i.e. the polypropylenes produced in presence of a metallocene-based catalyst, used in the present invention can be homopolymers or copolymers of propylene and at least one comonomer. Said comonomers can be selected from the group consisting of ethylene and $C_4$-$C_{10}$ alpha-olefins, such as 1-butene, 1-pentene, 1-hexene, 1-octene. The copolymers can be random copolymers or heterophasic copolymers.

The metallocene random copolymers of the present invention comprise at least 0.1 wt % of comonomer(s), preferably at least 0.2 wt %, more preferably at least 0.5 wt %, even more preferably at least 1 wt %, most preferably at least 2 wt %. They comprise up to 10 wt % of comonomer(s), preferably up to 8 wt %, and most preferably up to 6 wt %. Preferably; the metallocene random copolymers are copolymers of propylene and ethylene.

The metallocene heterophasic copolymers of the present invention comprise a matrix, which in turn is made of a metallocene propylene homopolymer or random copolymer as defined above, and a rubber phase. Preferably, the metallocene heterophasic copolymers are copolymers of propylene and ethylene. They have an ethylene content in the range from 4 wt % to 15 wt %. The metallocene heterophasic copolymers comprise from 5 wt % to 35 wt % of rubber phase. Preferably, the rubber phase is an ethylene propylene rubber (EPR).

Metallocene propylene homopolymers are the most preferred metallocene polypropylenes used in the present invention.

The polymerization of propylene and one or more optional comonomers is performed in the presence of one or more metallocene-based catalytic systems comprising one or more metallocenes, a support and an activating agent. Such metallocene-based catalytic systems are known to the person skilled in the art and need not be explained in detail.

The metallocene component used to prepare the metallocene polypropylene can be any bridged metallocene known in the art. Preferably it is a metallocene represented by the following general formula.

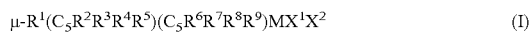

$$\mu\text{-}R^1(C_5R^2R^3R^4R^5)(C_5R^6R^7R^8R^9)MX^1X^2 \qquad (I)$$

wherein
the bridge $R^1$ is $-(CR^{10}R^{11})_p-$ or $-(SiR^{10}R^{11})_p-$ with p=1 or 2, preferably it is $-(SiR^{10}R^{11})-$;
M is a metal selected from Ti, Zr and Hf, preferably it is Zr;
$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl;
$R^2$, $R^3$, $R^4$, $R^5$, $R^6$, $R^7$, $R^8$, $R^9$, $R^{10}$ and $R^{11}$ are each independently selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring; each $R^2$, $R^3$, $R^4$, $R^5$, $R^6$, $R^7$, $R^8$, $R^9$, $R^{10}$ and $R^{11}$ may in turn be substituted in the same way.

The preferred metallocene components are represented by the general formula (I), wherein
the bridge $R^1$ is $SiR^{10}R^{11}$;
M is Zr;
$X^1$ and $X^2$ are independently selected from the group consisting of halogen, hydrogen, and $C_1$-$C_{10}$ alkyl; and
$(C_5R^2R^3R^4R^5)$ and $(C_5R^6R^7R^8R^9)$ are indenyl of the general formula $C_9R^{12}R^{13}R^{14}R^{15}R^{16}R^{17}R^{18}R^{19}$, wherein $R^{12}$, $R^{13}$, $R^{14}$, $R^{15}$, $R^{16}$, $R^{17}$, $R^{18}$ and $R^{19}$ are each independently selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring;
$R^{10}$ and $R^{11}$ are each independently selected from the group consisting of $C_1$-$C_{10}$ alkyl, $C_5$-$C_7$ cycloalkyl, and $C_6$-$C_{15}$ aryl, or $R^{10}$ and $R^{11}$ may form a cyclic saturated or non-saturated $C_4$-$C_{10}$ ring; and
each $R^{10}$, $R^{11}$, $R^{12}$, $R^{13}$, $R^{14}$, $R^{15}$, $R^{16}$, $R^{17}$, $R^{18}$ and $R^{19}$ may in turn be substituted in the same way.

The polypropylenes produced with the preferred metallocene compounds have surprisingly been identified as having a very low content of volatile organic compounds (VOC).

Particularly suitable metallocenes are those having $C_2$-symmetry.

Examples of particularly suitable metallocenes are:
dimethylsilanediyl-bis(cyclopentadienyl)zirconium dichloride,
dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(3-tert-butyl-cyclopentadienyl)zirconium dichloride,
dimethylsilanediyl-bis(3-tert-butyl-5-methyl-cyclopentadienyl)zirconium dichloride,
dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(3,3'-2-methyl-benzindenyl)zirconium dichloride,
dimethylsilanediyl-bis(4-phenyl-indenyl)zirconium dichloride,
ethylene-bis(indenyl)zirconium dichloride,
ethylene-bis(tetrahydroindenyl)zirconium dichloride,
isopropylidene-(3-tert-butyl-5-methyl-cyclopentadienyl) (fluorenyl) zirconium dichloride.

The polymerization of propylene and one or more optional comonomers in presence of a metallocene-based catalytic system can be carried out according to known techniques in one or more polymerization reactors. The metallocene polypropylenes of the present invention are preferably produced by polymerization in liquid propylene at temperatures in the range from 20° C. to 100° C. Preferably, temperatures are in the range from 60° C. to 80° C. The pressure can be atmospheric or higher. It is preferably between 25 and 50 bar. The molecular weight of the polymer chains, and in consequence the melt flow of the metallocene polypropylene, is regulated by the addition of hydrogen to the polymerization medium.

The metallocene polypropylenes of the present invention are characterized by a melt flow index in the range from 1 to 100 dg/min (as measured according to ISO 1133, condition L, at 230° C. under 2.16 kg). Preferably, the melt flow index is at least 5 dg/min, and more preferably it is at least 10 dg/min. Preferably, the melt flow index is at most 80 dg/min, more preferably at most 60 dg/min, even more preferably at most 50 dg/min, and most preferably at most 40 dg/min.

The metallocene propylene homopolymers used in the present invention are characterized by a melting temperature in the range from 135° C. to 165° C., preferably in the range from 140° C. to 160° C., and most preferably in the range from 145° C. to 155° C. The determination of melting temperatures is well known to the person skilled in the art. Generally, in order to erase the thermal history of the samples they are first heated to a temperature above the melting temperature, e.g. to 200° C., and kept there for a time, e.g. for 3 minutes. After cooling the sample are then reheated for the measurement of the melting temperature.

The metallocene propylene homopolymers used in the present invention are characterized by a xylene solubles content of less than 3 wt %, preferably of less than 2.5 wt %, and most preferably of less than 2 wt %. The xylene solubles content is determined by dissolving the polypropylene in refluxing xylene, cooling of the solution to 25° C., filtering the solution, and subsequent evaporation of the solvent. The residue, which is the xylene soluble portion of the polypropylene, is then dried and weighed.

The metallocene polypropylenes used in the present invention are characterized by a high isotacticity, for which the content of mmmm pentads is a measure. The content of mmmm pentads is at least 95%, preferably at least 97%. The isotacticity is determined by NMR analysis according to the method described by G. J. Ray et al. in Macromolecules, vol. 10, n° 4, 1977, p. 773-778. It is performed on the dried product resulting from the extraction by boiling hexane of the xylene insoluble fraction.

Whilst not wishing to be bound by theory it is believed that the degradation of polypropylene and in consequence the formation of volatile organic compounds is partly due to metallic residues from the polymerization catalyst. It is therefore desirable to have a low content of metallic residues in the polypropylene. The metallocene polypropylene used in the present invention is therefore characterized by a zirconium content in the range from 0.01 ppm to 5 ppm. The zirconium content is preferably at least 0.1 ppm. The zirconium content is preferably 4 ppm or less, more preferably 3 ppm or less, even more preferably 2 ppm or less and most preferably 1 ppm or less. The zirconium content can be measured by an inductively coupled plasma technique with atomic emission spectroscopy.

The elastomer, also referred to as "rubber", used in the present invention can be any elastomer known in the art. The elastomer can for example be selected from the group consisting of natural rubber, butadiene elastomer, isoprene elastomer, chloroprene elastomer, hydrogenated styrene-butadiene elastomer, styrene-ethylene/butene-styrene block copolymer, hydrogenated styrene-isoprene elastomer, hydrogenated styrene-ethylene/isoprene-styrene block copolymer, acrylic rubber, butyl elastomer, ethylene-propylene elastomer, ethylene-octene elastomer, ethylene-butylene elastomer, styrene-butadiene-styrene elastomer, butylene-propylene elastomer, pentene-propylene elastomer, hexene-propylene elastomer, octene-propylene elastomer, ethylene-propylene-ethylidene norbornene elastomer, ethylene-propylene-vinyl norbornene elastomer, ethylene-propylene-unconjugated diene elastomer, hydrogenated ethylene-butadiene elastomer, styrene butadiene styrene, and mixtures thereof. The preferred elastomers are ethylene-propylene elastomers, ethylene-octene elastomers, ethylene-butylene elastomers, styrene-butadiene-styrene elastomers and mixtures thereof.

According to another embodiment of the present invention, the blend comprises from 0 wt % to 50 wt % of a mineral filler, said mineral filler being preferably selected from the group consisting of talc, wollastonite, mica, glass fibers, calcium carbonate and mixtures thereof. The preferred amount of mineral filler is in the range from 5 wt % to 40 wt % of the blend, and more preferably in the range from 10 wt % to 30 wt %. Surprisingly, it has been found that the narrower molecular weight distribution of a metallocene polypropylene as compared to a Ziegler-Natta polypropylene does not negatively influence the distribution of the mineral filler in the blend.

According to yet another embodiment of the present invention, said blend comprises from 0 wt % to 79.9 wt % of a propylene polymer selected from the group consisting of Ziegler-Natta catalyzed propylene homopolymers and copolymers and mixtures thereof, that is, propylene polymers polymerized in the presence of a non-metallocene-based catalyst.

The blend according to the present invention may also comprise from 0 wt % to 10 wt %, preferably from 0.1 wt % to 5 wt % of additives such as, by way of example, antioxidants, light stabilizers, acid scavengers, lubricants, antistatic additives, nucleating/clarifying agents, colorants, as long as the addition of the additive does not obstruct the above-mentioned objects of the present invention. An overview of such additives may be found in Plastics Additives Handbook, ed. H. Zweifel, $5^{th}$ edition, 2001, Hanser Publishers.

The blend is prepared in any known manner, such as by mechanical blending in an extruder. According to one embodiment, the metallocene polypropylene, the elastomer, the optional mineral filler, the optional Ziegler-Natta polypropylene and the optional additives are introduced into the extruder in the form of a powder or of pellets. The optional mineral filler is preferably introduced in the middle of the extruder. In a preferred embodiment, the extruder is equipped with a vacuum pump on an extruder vent that allows removal of volatile organic compounds (VOC) from the blend.

It has been surprisingly noted that even though a vacuum pump was used to remove volatile organic compounds (VOC) during extrusion of a blend comprising Ziegler-Natta polypropylene the residual content of volatile organic compounds (VOC) was drastically reduced when said Ziegler-Natta polypropylene was substituted by metallocene polypropylene. In fact, the reduction in volatile organic compounds (VOC) was surprisingly high in view of the percentage of polypropylene in the blend.

The mechanical properties of the blends of the present invention comprising metallocene polypropylene resemble those of the respective blends wherein the metallocene polypropylene is substituted by a Ziegler-Natta polypropylene. In a preferred aspect the flexural modulus of a blend comprising the metallocene polypropylene is at least 70%, preferably at least 80% and most preferably at least 90% of the flexural modulus of the respective blend, wherein the metallocene polypropylene is substituted by a Ziegler-Natta polypropylene. In another preferred aspect the impact strength of the blend comprising the metallocene polypropylene is at least 70% and preferably at least 80% of the impact strength of the respective blend, wherein the metallocene polypropylene is substituted by a Ziegler-Natta polypropylene.

The present invention also relates to the use of a blend according to the present invention for manufacturing automobile parts. In particular, it relates to the use of a blend according to the present invention for producing automobile parts having less than 45 ppm of volatile organic compounds (determined in accordance with VDA-278).

The details and embodiments described above in connection with the blend also apply to the use according to the present invention.

The automobile parts of the invention are preferably produced by molding the propylene-based resin composition in any conventional injection molding method such as injection molding, extrusion, compressed injection molding and vapor-blowing injection molding. The preferred method is injection molding.

The blends of the present invention can be used to produce automobile parts such as interior parts like door panels, instrument panels, consoles, A, B, C pillar trims, seat protectors, air ducts, door lists, door trims, air-bag containers and others. The automobile parts also include exterior parts like body panels, bumpers, rocker panels, door lists, side sills, cowl covers and others.

EXAMPLES

The invention is illustrated with the following examples.

Blend Components mPP Metallocene propylene homopolymer with a melt flow index of 25 dg/min (ISO 1133, 230° C., 2.16 kg). It is characterized by a flexural modulus of 1300 MPa (ISO 178) and a melting point of 151° C. (ISO 3146).

Elast Ethylene-butene copolymer with a melt index of 5 dg/min (ASTM D 1238), a density of 0.865 g/cm$^3$ (ASTM D 792) and a Mooney viscosity $ML_{1+4}$ at 121° C. of 7 (ASTM D 1646). It is characterized by a Shore A hardness of 64 (ASTM D 2240) and a flexural modulus (1% secant) of 7.8 MPa (ASTM D 790). Commercially available from Dow Chemical Company as Engage ENR 7447.00.

Talc Talc with a particle size distribution of 97% for under 10 μm, 82% for under 5 μm and 45% for under 2 μm. It is characterized by an oil absorption of 50 g/100 g. Such a talc is for example commercially available from Mondo Minerals OY as Finntalc M05.

ZNPP-1 Heterophasic propylene copolymer comprising about 12 wt % of ethylene-propylene rubber with a melt flow index of 25 dg/min (ISO 1133, 230° C., 2.16 kg). It is characterized by a flexural modulus of 1300 MPa (ISO 178), an Izod impact strength of 7 kJ/m$^2$ at 23° C. and 5 kJ/m$^2$ at −20° C. (ISO 180), a Charpy impact strength (notched) of 8 kJ/m$^2$ at 23° C. and 5.5 kJ/m$^2$ at −20° C. (ISO 179) and a melting point of 165° C. (ISO 3146).

ZNPP-2 Nucleated antistatic heterophasic propylene copolymer comprising about 12 wt % of ethylene-propylene rubber with a melt flow index of 44 dg/min (ISO 1133, 230° C., 2.16 kg). It is characterized by a flexural modulus of 1500 MPa (ISO 178), an Izod impact strength of 7.5 kJ/m$^2$ at 23° C. and 4 kJ/m$^2$ at −20° C. (ISO 180), a Charpy impact strength (notched) of 7 kJ/m$^2$ at 23° C. and 4.5 kJ/m$^2$ at −20° C. (ISO 179) and a melting point of 165° C. (ISO 3146).

B225 Irganox B225 is a 1:1 blend by weight of Irganox 1010 and Irgafos 168. It is commercially available from Ciba Specialty Chemicals.

PEB3089 Black color masterbatch with 40 wt % of carbon black, having a carbon black particle size between 20 nm and 25 nm in a LDPE carrier, supplied by Hubron Manufacturing Division Ltd.

Blends

These blend components were used to prepare blends according to the present invention and also comparative blends outside of the scope of the present invention. Blend compositions are shown in table 1 with the amounts given in wt % of the total blend. The blends were compounded on a Leistritz Micro27 GL36D extruder and the test samples needed for performing mechanical and other testing were injection molded on an Engel ES 500/125 HL injection molding machine.

TABLE 1

|  |  | Comparative example | Example |
|---|---|---|---|
| mPP | wt % |  | 30.00 |
| Elast | wt % | 20.00 | 24.50 |
| ZNPP-1 | wt % | 28.15 | 13.65 |
| ZNPP-2 | wt % | 20.00 |  |
| Talc | wt % | 30.60 | 30.60 |
| Erucamide | wt % | 0.15 | 0.15 |
| B225 | wt % | 0.10 | 0.10 |
| PEB3089 | wt % | 1.00 | 1.00 |
| Total | wt % | 100 | 100 |

Test Methods

The melt flow index was measured according to norm ISO 1133, condition L, using a weight of 2.16 kg and a temperature of 230° C.

The coefficient of linear thermal expansion (CLTE) was determined according to ASTM D696.

Flexural modulus was measured according to ISO 178. Tensile modulus was measured according to ISO 527. The same measurement gave values for stress at yield, strain at yield and elongation at break.

Cut-notched Izod impact strength was measured according to ISO 180-1A at 23° C. Cut-notched Charpy impact strength was measured according to ISO 179-1eA at 23° C. and −20° C.

Furthermore, two tests were performed in order to measure the total desorption as well as the amount of volatile organic compounds (VOC) and the fogging (FOG), according to the German automobile standard VDA-278. In this latter test, in order to measure the amount of VOC, the material is heated to 90° C. and maintained at this temperature for 30 minutes. The vapors are then condensed at −150° C., and the composition of the condensate is determined by gas chromatography. After the VOC has been measured, the sample is further heated up to 120° C. and maintained in this temperature for 60 minutes, in order to measure the FOG. The vapors are then condensed and the content of the condensate is determined in the same manner as for VOC.

Results

Results of the analyses for the example blends and the comparative example blends are given in table 2 for mechanical properties. Results of the test according to VD1-278 are shown in table 3.

The results in table 2 show that similar mechanical properties are obtained when replacing the Ziegler-Natta catalyzed polypropylenes partially or totally with metallocene catalyzed polypropylenes.

In summary the results show that the use of metallocene polypropylenes in blends for automotive applications leads to a drastic reduction in the emission of volatile organic compounds. Surprisingly, the use of metallocene polypropylene in blends for automotive applications does not lead to a loss in mechanical properties as compared to the respective blends with Ziegler-Natta polypropylenes.

TABLE 2

|  |  | Comparative example | Example |
|---|---|---|---|
| MFI | dg/min | 14.8 | 14 |
| CLTE in MD | mm/m/° C. | 44.3 | 55.8 |
| Flexural Modulus | MPa | 1720 | 1644 |
| Tensile Modulus | MPa | 1647 | 1563 |
| Stress at yield | MPa | 17.2 | 18.3 |
| Strain at yield | % | 6.3 | 8.1 |
| Elongation at Break | % | 56.6 | 37.8 |
| Cut-notched Izod at 23° C. | kJ/m$^2$ | 29.7 | 26.3 |
| Cut-notched Charpy at 23° C. | kJ/m$^2$ | 27.4 | 23.8 |

TABLE 3

| | Units | Comparative example | Example |
|---|---|---|---|
| VOC | ppm | 59 | 32 |
| FOG | ppm | 290 | 51 |

The invention claimed is:

1. An automobile part comprising:
a blend, said blend comprising:
(a) from 99.1 wt. % to 20 wt. % of a polypropylene homopolymer produced in the presence of a metallocene-based catalyst, wherein the metallocene-based catalyst has C-2 symmetry, wherein the metallocene-based catalyst is selected from the group consisting of dimethylsilanediyl-bis(cyclopentadienyl)zirconium dichloride, dimethylsilanediyl-bis(2-methyl-cyclopentadienyl)zirconium dichloride, dimethylsilanediyl-bis(3-methyl-cyclopentadienyl)zirconium dichloride, dimethylsilanediyl-bis(3-tert-butyl-cyclopentadienyl)zirconium dichloride, dimethylsilanediyl-bis(3-tert-butyl-5-methyl-cyclopentadienyl)zirconium dichloride, dimethylsilanediyl-bis(2,4-dimethyl-cyclopentadienyl)zirconium dichloride, dimethylsilanediyl-bis(indenyl)zirconium dichloride, dimethylsilanediyl-bis(2-methyl-indenyl)zirconium dichloride, dimethylsilanediyl-bis(3-methyl-indenyl)zirconium dichloride, dimethylsilanediyl-bis(3-tert-butyl-indenyl)zirconium dichloride, dimethylsilanediyl-bis(4,7-dimethyl-indenyl)zirconium dichloride, dimethylsilanediyl-bis(tetrahydroindenyl)zirconium dichloride, dimethylsilanediyl-bis(benzindenyl)zirconium dichloride, dimethylsilanediyl-bis(3,3'-2-methyl-benzindenyl)zirconium dichloride, dimethylsilanediyl-bis(4-phenyl-indenyl)zirconium dichloride, ethylene-bis(indenyl)zirconium dichloride, ethylene-bis(tetrahydroindenyl)zirconium dichloride, and isopropylidene-(3-tert-butyl-5-methyl-cyclopentadienyl)(fluorenyl) zirconium dichloride;
(b) from 0.1 wt. % to 50 wt. % of an elastomer; and
(c) a Ziegler-Natta catalyzed propylene homopolymer, a Ziegler-Natta catalyzed propylene copolymer, or mixtures thereof;
said blend having less than 45 ppm of volatile organic compounds (determined in accordance with VDA-278).

2. The automobile part of claim 1, wherein the polypropylene homopolymer has a melt flow index of from 1 dg/min to 100 dg/min (measured according to ISO 1133, condition L, 230° C., 2.16 kg).

3. The automobile part of claim 1, wherein the polypropylene homopolymer has a melting temperature of from 135° C. to 165° C.

4. The automobile part of claim 1, wherein the polypropylene homopolymer has a xylene solubles content of less than 3 wt %.

5. The automobile part of claim 1, wherein the polypropylene homopolymer has a content of mmmm pentads of at least 97%.

6. The automobile part of claim 1, wherein the polypropylene homopolymer produced in the presence of a metallocene-based catalyst has a zirconium content in the range from 0.01 ppm to 5 ppm.

7. The automobile part of claim 1, characterized in that said blend comprises from 5 wt % to 50 wt % of a mineral filler.

8. The automobile part of claim 1, wherein the Ziegler-Natta catalyzed propylene homopolymer, Ziegler-Natta catalyzed propylene copolymer, or mixtures thereof is present in the blend in an amount of up to 79.9 wt %.

9. The automobile part of claim 1, wherein the blend exhibits a flexural modulus that is at least 70% of the flexural modulus of the respective blend wherein the metallocene polypropylene homopolymer is substituted by a Ziegler-Natta polypropylene.

10. The automobile part of claim 1, wherein the blend exhibits an impact strength that is at least 70% of the impact strength of the respective blend wherein the metallocene polypropylene homopolymer is substituted by a Ziegler-Natta polypropylene.

11. The automobile part of claim 1, wherein the automobile parts are interior automobile parts.

12. The automobile part of claim 1, wherein the automobile part is an injection molded automobile part.

13. An injection molded automobile part comprising:
a blend, said blend comprising:
(a) from 99.1 wt. % to 20 wt. % of a polypropylene homopolymer produced in the presence of a metallocene-based catalyst;
(b) from 0.1 wt. % to 50 wt. % of an elastomer; and
(c) a propylene polymer polymerized in the presence of a Ziegler-Natta catalyst;
said blend having less than 45 ppm of volatile organic compounds (determined in accordance with VDA-278).

14. The injection molded automobile part of claim 13, wherein the propylene polymer polymerized in the presence of the Ziegler-Natta catalyst is a Ziegler-Natta catalyzed propylene homopolymer, Ziegler-Natta catalyzed propylene copolymer, or mixtures thereof.

15. An automobile part comprising:
a blend, said blend comprising:
(a) from 99.1 wt. % to 20 wt. % of a polypropylene homopolymer produced in the presence of a metallocene-based catalyst;
(b) from 0.1 wt. % to 50 wt. % of an elastomer; and
(c) a propylene polymer selected from Ziegler-Natta catalyzed propylene homopolymers, Ziegler-Natta catalyzed propylene copolymers, and mixtures thereof;
said blend having less than 45 ppm of volatile organic compounds (determined in accordance with VDA-278);
wherein the metallocene-based catalyst is represented by formula (I)

$$\mu\text{-R}^1(C_5R^2R^3R^4R^5)(C_5R^6R^7R^8R^9)MX^1X^2 \qquad (I)$$

wherein bridged $R^1$ is $SiR^{10}R^{11}$;
wherein $R^{10}$ and $R^{11}$ are each independently selected from the group consisting of $C_1$-$C_{10}$ alkyl, $C_5$-$C_7$ cycloalkyl, and $C_6$-$C_{15}$ aryl, or wherein $R^{10}$ and $R^{11}$ form a cyclic saturated or non-saturated $C_4$-$C_{10}$ ring; and
wherein M is Zr;
wherein $X^1$ and $X^2$ are independently selected from the group consisting of halogen, hydrogen, and $C_1$-$C_{10}$ alkyl; and
wherein $(C_5R^2R^3R^4R^5)$ and $(C_5R^6R^7R^8R^9)$ are indenyl of the formula $C_9R^{12}R^{13}R^{14}R^{15}R^{16}R^{17}R^{18}R^{19}$; and
wherein $R^{12}$, $R^{13}$, $R^{14}$, $R^{15}$, $R^{16}$, $R^{17}$, $R^{18}$, and $R^{19}$ are each independently selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or wherein two neighboring R of $R^{12}$, $R^{13}$, $R^{14}$, $R^{15}$, $R^{16}$, $R^{17}$, $R^{18}$, and $R^{19}$ form a cyclic saturated or non-saturated $C_4$-$C_{10}$ ring.

16. The automobile part of claim 15, wherein the metallocene-based catalyst has C-2 symmetry.

17. The automobile part of claim 15, wherein the polypropylene homopolymer has a zirconium content in the range from 0.01 ppm to 5 ppm.

18. The automobile part of claim 1, wherein the blend comprises a Ziegler-Natta catalyzed propylene homopolymer.

19. The automobile part of claim 1, wherein the blend comprises a Ziegler-Natta catalyzed propylene copolymer.

20. The automobile part of claim 1, wherein the blend comprises a mixture comprising a Ziegler-Natta catalyzed propylene homopolymer and a Ziegler-Natta catalyzed propylene copolymer.

* * * * *